United States Patent [19]

Knowles et al.

[11] Patent Number: 4,762,984
[45] Date of Patent: Aug. 9, 1988

[54] LASER SCANNER APPARATUS WITH ADJUSTABLE MOUNT FOR CONNECTORS

[75] Inventors: Carl H. Knowles, Moorestown; Charles Naylor, Sewell, both of N.J.

[73] Assignee: Metrologic Instruments, Inc., Bellmawr, N.J.

[21] Appl. No.: 95,744

[22] Filed: Sep. 11, 1987

[51] Int. Cl.⁴ .............................................. G06K 15/00
[52] U.S. Cl. ..................................................... 235/383
[58] Field of Search ........................................ 235/383

[56] References Cited

U.S. PATENT DOCUMENTS 4,529,871 7/1985 Davidson ............................ 235/383

*Primary Examiner*—Harold I. Pitts
*Attorney, Agent, or Firm*—Caesar, Rivise, Bernstein, Cohen & Pokotilow, Ltd.

[57] ABSTRACT

A laser scanner device arranged to be mounted at a counter for producing a laser beam in a scanning pattern to read a bar code brought into the pattern. The device includes a box-like housing having at least first, second and third planar walls. A window is provided in the first wall and through which the scanning pattern emanates. The housing is arranged to be mounted on the counter so that the window is either horizontal or vertical. A connector mounting plate is releasably secured to the housing. The plate includes two wall portions. One wall portion includes a power cord projecting therefrom and at least one electrical plug mounted thereon. The electrical plug is adapted to be secured, via a cable, to equipment associated with the scanner device, such as a cash register. The connector mounting plate is arranged to be releasably secured to the housing so that it is flush with either of the outer two walls of the housing so that the plug and power cord can project in either of two directions from the housing when the window is in either the horizontal or vertical orientation.

18 Claims, 2 Drawing Sheets

LASER SCANNER APPARATUS WITH ADJUSTABLE MOUNT FOR CONNECTORS

BACKGROUND OF THE INVENTION

This invention relates generally to laser scanning devices and more particularly to laser scanning devices arranged to be mounted at a counter, such as a check-out counter of a retail merchandise establishment.

Laser scanning apparatus or devices for use in scanning bar-code bearing products at check-out counters in supermarkets and other retail establishments are gaining wider and wider acceptance. Such apparatus are generally mounted within the counter and have a window at the top thereof through which a scanning pattern is projected. The scanning pattern is usually composed of plural intersecting scan lines and is created by a laser and associated optical components, e.g., mirrors, lenses, etc., which are located within the housing and which project the scan lines out of the window. A bar code, such as the Uniform Product Code, which is imprinted on the packaging of the product to be scanned, is brought into the field of the scan pattern so that the lines of scan pattern traverse the bar code. Light reflected off the bar code is received back through the window of the scanning device by optical components and associated signal processing decoding circuitry, also located within the housing, to produce electrical signals indicative of the bar code. These signals can be utilized to identify the article bearing the code and to provide pricing information. To that end, it is a frequent practice to provide electrical output signals identifying the article bearing the code and pricing information to associated equipment, such as an electronic cash register, located at the check-out counter. These signals are normally provided via associated cable means connected from the scanning apparatus.

In U.S. patent application Ser. No. 06/800,486, filed on Nov. 21, 1985, entitled "Compact Omnidirectional Laser Scanner", and which application is assigned to the same assignee as this invention, there is disclosed an omnidirectional, compact laser scanning apparatus suitable for high performance use in counter-mounted applications. That apparatus is of particular utility in medium volume retail environments, such as in drug and convenience stores, and medium volume food markets. The optical design and simplified mechanics of that apparatus provides powerful scanning capabilities in an inexpensive, compactly housed system. In particular, the apparatus is housed within a small housing or box which makes installation convenient and inexpensive. Moreover, the entire unit is lightweight. Thus, the unit can be installed in existing counters without expensive remodeling and is suitable for removal from the counter in minutes to service the components within the housing. The apparatus features flush mounting and a gateless construction to accommodate bulky or flat merchandise and to maximize counter surface.

In accordance with a preferred embodiment of the invention covering that apparatus, the housing is of short height, e.g., six inches or less, so that it will leave ample leg room when mounted under the counter for seated point-of-sale stations in stores. Moreover, owing to the short height of the scanner, it can be utilized or located directly on top of the counter for some applications, that is, applications where there is insufficient space below the counter to mount the unit.

While the apparatus of the foregoing patent application is suitable for its intended purposes, in some installations the electrical connector(s) and cables connecting the apparatus to the associated equipment, e.g., electronic cash register, as well as the apparatus power cord may interfere with the mounting or location of the unit with respect to the counter or may project outward from the housing in a less than desirable orientation. Moreover, in some applications, it may be desirable to mount the apparatus so that its window is vertical.

OBJECTS OF THE INVENTION

Accordingly, it is a general object of the instant invention to provide a laser scanning apparatus which overcomes the disadvantages of the prior art.

It is a further object of this invention to provide a laser scanning apparatus comprising a housing having adjustable mounting means for the apparatus' power cord and electrical conductor(s) to enable the same to be positioned in selected orientations with respect to the housing.

It is still a further object of the instant invention to provide a housing having releasably secureable connector mounting means thereon which is arranged to be releasably secured to the housing in various orientations to expedite the mounting or location of the housing with respect to a counter.

SUMMARY OF THE INVENTION

These and other objects of the instant invention are achieved by providing a laser scanning device for location at a counter to produce a laser beam in a scanning pattern adjacent the device to read a bar code brought into the pattern and to provide electrical output signals indicative thereof, via electrical conductor means, to associated equipment. The device comprises a housing in which the means for producing the beam and the means for producing the electrical signals are located. The housing also comprises at least first, second and third wall portions and connector mounting means. The wall portions are disposed at respective angles to one another, with the first wall portion including a window therein and through the scanning pattern passes. The housing is arranged to be mounted with respect to the counter so that the window is either disposed vertically or horizontally. The connector mounting means includes a fourth wall portion and a fifth wall portion which are disposed at an angle to each other and connector means secured thereto. The connector means is adapted to be electrically coupled to the electrical conductor means to provide the electrical signals to the associated equipment. The connector means comprises means electrically connected to the means for producing the electrical signals and at least a first electrical connector connected thereto. The first connector is adapted to be releasably secured electrically to the electrical conductor means and is fixedly mounted on the fourth wall portion of the connector mounting means. The connector mounting means is releasably secureable to the housing so that the first connector and the fourth wall portion may be disposed immediately adjacent either the second or third wall portion of the housing while the fifth wall portion is disposed immediately adjacent either the third or second wall portions, respectively.

DESCRIPTION OF THE DRAWING

Other objects and many of the attendant advantages of this invention will be readily appreciated as the same becomes better understood by reference to the following detailed description when considered in connection with the accompanying drawing wherein.

DETAILED DESCRIPTION OF THE PREFERRED EMBODIMENT

Figure 1:
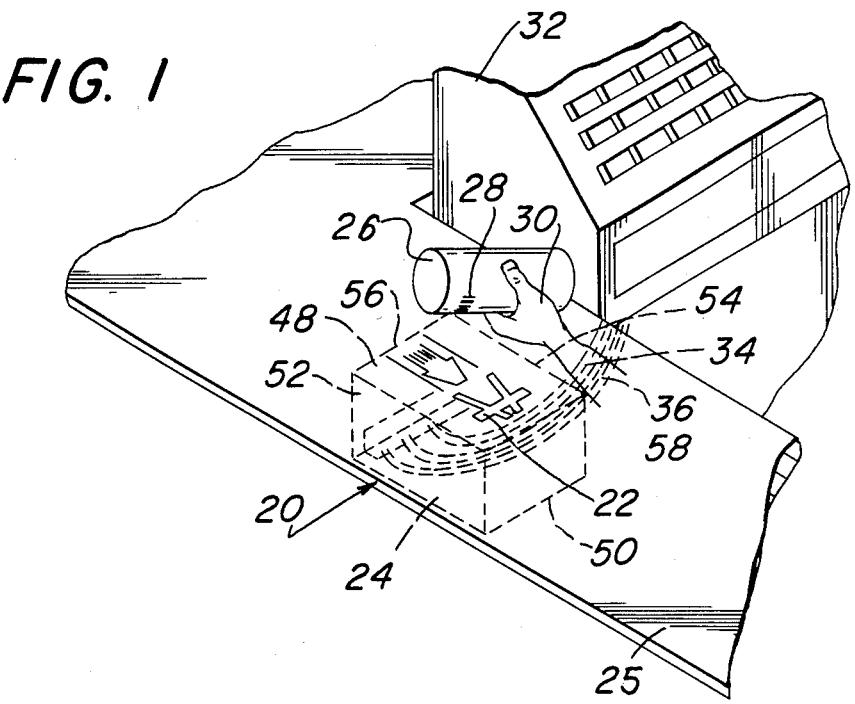
FIG. 1 is a perspective view of a typical check-out counter utilizing the laser scanning apparatus of the subject invention shown mounted horizontally below the counter.

Referring now in greater detail to the various figures of the drawing wherein like reference characters refer to like parts, there is shown generally at 20 in FIG. 1 a laser scanner constructed in accordance with the subject invention. The scanner 20 includes a window 22 through which a scanning pattern (not shown) is projected from means (not shown, but to be described later) located within the housing.

Figure 2:
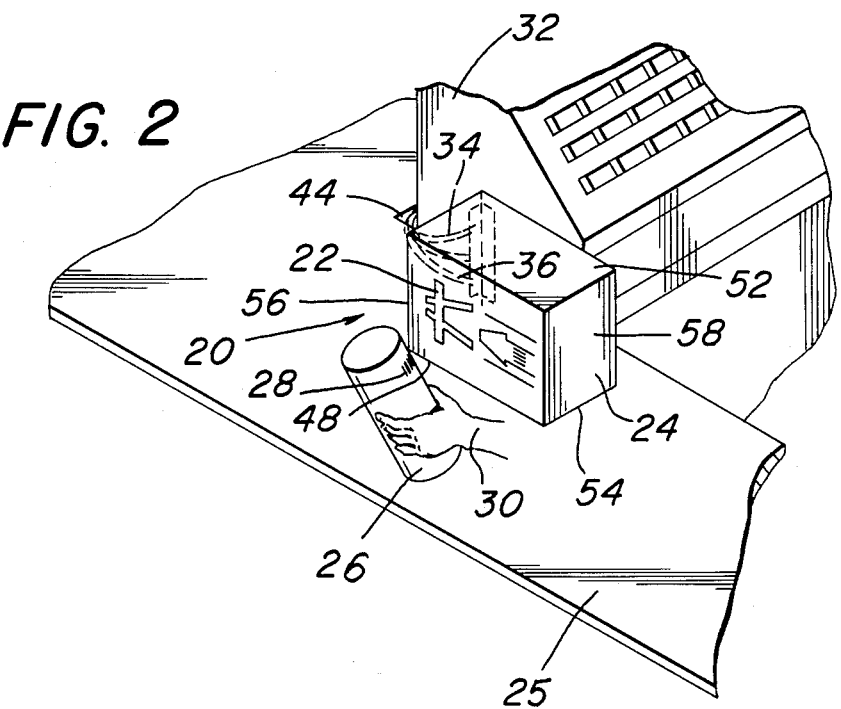
FIG. 2 is a perspective view similar to that of FIG. 1 but showing the laser scanning apparatus of the subject invention in an alternative orientation, namely, located and disposed vertically on the counter.

In accordance with the preferred embodiment of this invention, the scanner 20 includes a box-like housing 24, which is arranged to be located on a counter (such as shown in FIG. 2) or under the counter (such as shown in FIG. 1) and with its window 22 either disposed horizontally or vertically, in order to accommodate the various conditions of service to which it may be put.

An article, such as a food container 26, having conventional bar code 28 (e.g., a UPC code) printed thereon is brought into the pattern by the check-out clerk 30 to enable the lines of the pattern to sweep across the bar code, whereby light reflected off the bar code is received back through the window and acted upon by the optical and signal processing components of the scanner (to be described later) to process and decode the bar code bearing signal(s).

Figure 3:
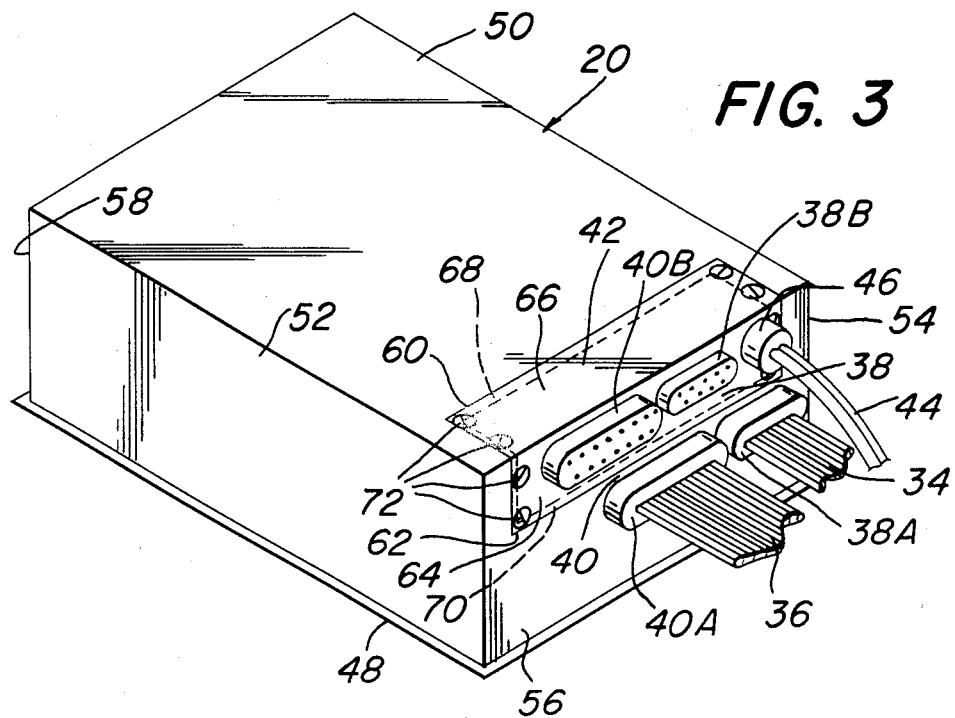
FIG. 3 is an enlarged perspective view of the apparatus shown in FIGS. 1 and 2 and with the electrical connector mounting means thereof shown in one orientation with respect to the housing.
Figure 4:
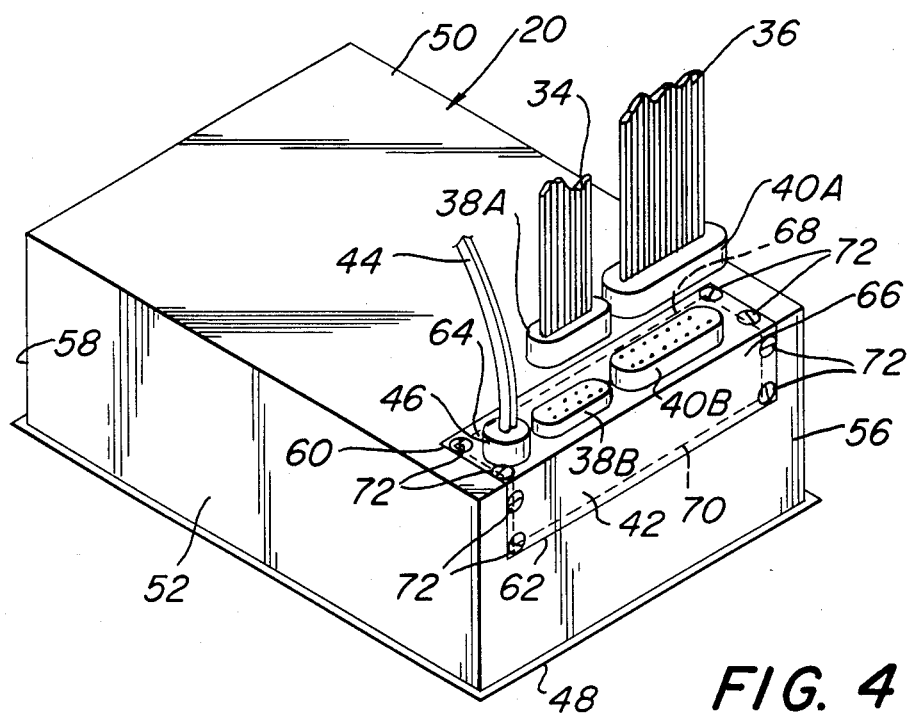
FIG. 4 is a view similar to that of FIG. 3 but showing the electrical connector mounting means in an alternative orientation with respect to the housing.

As is conventional, the apparatus 20 is arranged to be interconnected with an electronic cash register 32, or some other peripheral equipment to provide signals indicative of the decoded information thereto. The means for providing these signals constitute at least one multi-wire electrical cable. In the embodiment shown herein, the device 20 provides signals via two cables 34 and 36 (FIGS. 3 and 4). The cables 34 and 36 are conventional multiwire cables and connected to the device 20 via a pair of conventional "D" type connectors 38 and 40, respectively, (FIGS. 3 and 4). Each of the connectors includes a pair of mating plug portions. These two plug portions mate with each other to effect the interconnection of the multiple conductors, as is conventional. In the embodiment shown herein, the connector 38 includes plug portions 38A and 38B whereas the connector 40 includes plug portions 40A and 40B. The plug portions 38A and 40A are connected to one end of the cables 36 and 34, respectively. The other end (not shown) of each of the cables is connected to the cash register 32 in a conventional manner. The plug portions 38B and 40B are each fixedly mounted on a connector mounting plate 42, which forms a portion of the housing 24. Each of the fixedly mounted plugs 38B and 40B are also electrically interconnected, electrical conductors via (not shown) located within the housing, to the circuitry making up the scanner, e.g., the signal processing circuitry, etc. A power cord 44, such as a conventional 110 volt, grounded cord extends through a coupling 46 fixedly mounted on the connector mounting plate 42. The coupling holds the cord in place thereon. The electrical conductors of the power cord 44 extend through the coupling 46 into the interior of the housing 22 for connection to the power supply circuitry (not shown) of the apparatus.

Before describing the details of the housing and of the connector mounting plate, a brief description of the mechanical, optical and electrical components of the device (all of which are located within the housing) is in order. However, in the interests of brevity and simplicity, those components will not be described in detail nor will they be shown in the drawing. To that end, the device 20 includes a laser tube and associated power supply. The laser tube is arranged when provided with electric current from the power supply to produce a coherent beam of light. This beam of light is directed out of a lens located at the end of the laser tube. The beam then impinges on various mirrors forming the optical components of the apparatus. These mirrors direct the beam to a beam sweeping device, such as a multi-faceted, mirrored, polygon. The polygon is arranged to be rotated by a motor about an axis to sweep the laser beam across a plurality of angularly oriented mirrors. The sweep of the beam across those mirrors defines the particular scanning pattern. Thus, the swept laser beam projects off the mirrors out through the window 22 of the housing 24 and into the air space contiguous with the window. A bar code 28 brought into that pattern is swept by the beam, whereupon light reflected off the pattern is received back through the window by photocell means located within the housing. The photocell means and associated signal processing components convert the reflected light signals into electrical signals indicative of the bar code. Decoder circuitry is also provided in the housing to produce electrical signals, such as in ASCII format, indicative of the decoded symbol. These signals are provided via the cables 34 and 36 to the peripheral equipment, e.g., the electronic cash register 32.

The size of the housing for the apparatus 20 can be of any suitable dimension. In accordance with the preferred embodiment of this invention, the housing is extremely compact. In particular, the height or depth of the housing, that is, the dimension from the wall having the window thereon to the oppositely disposed wall (to be described later) is six inches or less. This enables the apparatus, when mounted under the counter 26 with the window 22 disposed horizontally to provide sufficient space to enable a check-out clerk to sit with his or her knees under the housing. This feature is of considerable importance for applications in European countries where laws require that the counter check-out personnel be seated.

The details of the housing 24 will now be described. As can be seen in the figures, the housing is of a box-like construction and basically comprises a planar, rectangular top (or front) wall 48 (FIGS. 1 and 2), a parallelly disposed planar, rectangular bottom (or rear) wall 50 (FIGS. 3 and 4), a pair of opposed parallel, planar, rectangular side walls 52 and 54, and a pair of opposed parallel, planar, rectangular end walls 56 and 58.

The top wall 48 includes the heretofore identified window 22 therein. In the embodiment shown herein, the window is formed to the profile of the scanning pattern produced by the apparatus, but other shaped windows can, of course, be utilized. The side walls, end walls and bottom wall are formed as an integral unit of any suitable material, such as stainless steel. The top edge of the side walls and end walls is in the form of an inwardly directed flange (not shown). This flange serves as a mount for the top wall. To that end, the top wall comprises a planar, rectangular plate which is releasably secured to the flanges of the side walls and end walls by fastening means (not shown) to completely seal the components of the apparatus within the housing. By removing the top plate 48 access to the interior of the housing 24 is readily accomplished. The top wall plate 48 is also formed of a suitable material, such as stainless steel.

As can be seen in FIGS. 3 and 4, a portion of the bottom wall 50 of the housing contiguous with the end wall 56 has an elongated rectangularly shaped recess 60 therein. In a similar manner, the portion of the end wall 56 contiguous with the bottom wall 50 also includes a similarly shaped recess 62 therein. The two recesses 60 and 62 conjointly define an opening to the housing and which is arranged to be sealed closed by the connector mounting plate 42. The connector mounting plate will be described in detail later. Suffice it for now to state that it is made up of two wall portions 64 and 66 which are disposed perpendicularly to each other.

The marginal edge of the recess 60 in the bottom wall 50 of the housing 24 is in the form of a slightly offset flange 68. The flange 68 is offset below the plane of the outer surface of the bottom wall 50 by a distance equal to the thickness of either of the connector mounting plate's walls 64 and 66. A similar offset flange 70 is provided about the periphery of the recess 62 in the housing's end wall 56, and is also offset by the thickness of either of the connector mounting plate's walls 64 and 66.

The wall portions of the connector mounting plate basically comprises two elongated strip portions which are joined along their longitudinal edge to form a generally L-shaped elongated member. Each wall portion 64 and 66 is sized to fit within either of the recesses 60 and 62, while being supported on the offset flanges 68 and 70 thereof. Thus, the flanges support the mounting plate 42 over the opening created by the recesses. The mounting plate is arranged so that it can be disposed with either its wall portion 64 within recess 62 and its wall portion 66 located within recess 60 (as shown in FIG. 3) or, alternatively, with its wall portion 64 is located within recess 60 and its wall portion 66 is located within recess 62 (as shown in FIG. 4). The mounting plate 42 is arranged to be releasably secured in place in either of these two orientations, via plural threaded fasteners, e.g., screws 72, extending through holes in the periphery of the mounting plate and aligned holes within the offset flanges.

As will be appreciated by those skilled in the art, if in mounting the housing 20, either horizontally or vertically, the cables and power cord would interfere with the mounting or project from the housing in an undesirable direction the mounting plate can be reoriented to obviate that problem. Thus, the mounting plate 42 can be removed from the housing by unscrewing the screws 72 and rotating the plate 42 from the position shown in FIG. 4 to the position shown in FIG. 3 and thereafter reconnecting the plate in place if its is desired that the cables and power cord project away from the end wall 56. Conversely, if the cables and power cord are not desired to project from the end wall 56, but are rather desired to project from the bottom wall 50, the connector mounting plate can be switched to the orientation as shown in FIG. 4 and secured in place.

As will be appreciated from the foregoing, the apparatus 20 has wide applicability of use in that it can be mounted either above or below a counter and either horizontally or vertically, with the cables and conductors projecting from a desired wall thereof to facilitate mounting and/or provide a neat and tidy arrangement.

Without further elaboration, the foregoing will so fully illustrate my invention that others may, by applying current or future knowledge, adopt the same for use under various conditions of service.

What is claimed is:

1. A laser scanning device for location at a counter for producing a laser beam in a scanning pattern adjacent said device to read a bar code brought into said pattern and for providing electrical output signals indicative thereof via electrical conductor means to associated equipment, said scanning device comprising a housing in which means for producing said beam and means for producing said electrical signals are located, said housing comprising at least first, second and third wall portions and connector mounting means, said wall portions being disposed at respective angles to one another, said first wall portion including a window therein and through which said scanning pattern passes, said housing being arranged to be mounted with respect to said counter so that said window is either disposed vertically or horizontally, said connector mounting means including a fourth wall portion and a fifth wall portion connected at an angle to each other and connector means secured thereto, said connector means being adapted to be electrically coupled to said electrical conductor means to provide said electrical signals to said associated equipment, said connector means comprising means electrically connected to said means for producing said electrical signals and at least a first electrical connector connected thereto, said first connector being adapted to be releasably secured electrically to said electrical conductor means and being fixedly mounted on said fourth wall portion of said connector mounting means, said connector mounting means being releasably secureable to said housing so that said first connector and said fourth wall portion may be disposed immediately adjacent either said second or third wall portions of said housing while said fifth wall portion is disposed immediately adjacent either said third or said second wall portions, respectively.

2. The laser scanning device of claim 1 wherein said first connector comprises an electrical plug.

3. The laser scanning device of claim 1 additionally comprising an electrical power cord arranged to project outward from said fourth wall portion of said connector mounting means.

4. The laser scanning device of claim 3 wherein said first connector comprises an electrical plug.

5. The laser scanning device of claim 3 additionally comprising a second connector fixedly mounted on said fourth wall portion of said connector mounting means.

6. The laser scanning device of claim 5 wherein said second connector comprises an electrical plug.

7. The laser scanning device of claim 1 wherein said housing is of box-like construction and wherein each of said first, second and third wall portions is generally planar, with the second wall portion extending perpendicularly to the first wall portion and with the third wall portion extending parallelly to said first wall portion.

8. The laser scanning device of claim 7 wherein said fourth and fifth wall portions of said connector mounting means are each generally planar and extend perpendicularly to each other so that said fourth and fifth wall portions of said connector mounting means can be disposed flush with said second and third wall portions of said housing, and vice versa.

9. The laser scanning device of claim 8 wherein said first connector comprises an electrical plug.

10. The laser scanning device of claim 9 additionally comprising an electrical power cord arranged to project outward from said fourth wall portion of said connector mounting means.

11. The laser scanning device of claim 10 additionally comprising a second connector fixedly mounted on said fourth wall of said connector mounting means.

12. The laser scanning device of claim 11 wherein said second connector comprises an electrical plug.

13. The laser scanning device of claim 8 wherein said housing includes a recess in said second wall portion and a recess in said third wall portion and wherein said recesses are contiguous with one another to form an opening in which said connector mounting means is releasably secured.

14. The laser scanning device of claim 13 wherein each of said recesse includes an offset flange therein for supporting a portion of said connector mounting means thereon.

15. The laser scanning device of claim 1 wherein said first wall portion is releasably secureably to other wall portions of said housing to provide access to the interior thereof.

16. The laser scanning device of claim 15 wherein said housing is formed of stainless steel.

17. The laser scanning device of claim 13 wherein said first wall portion is releasably secureably to other wall portions of said housing to provide access to the interior thereof.

18. The laser scanning device of claim 17 wherein said housing is formed of stainless steel.

* * * * *